(12) United States Patent
Gregg et al.

(10) Patent No.: US 7,099,955 B1
(45) Date of Patent: Aug. 29, 2006

(54) END NODE PARTITIONING USING LMC FOR A SYSTEM AREA NETWORK

(75) Inventors: Thomas Anthony Gregg, Highland, NY (US); Gregory Francis Pfister, Austin, TX (US); Renato John Recio, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 09/692,351

(22) Filed: Oct. 19, 2000

(51) Int. Cl.
*G06F 15/173* (2006.01)

(52) U.S. Cl. .................. 709/238; 709/220; 709/221; 709/222; 709/239; 709/240; 709/245; 710/316; 707/2

(58) Field of Classification Search .............. 707/2; 709/238–245, 220–222; 375/200; 710/316
See application file for complete search history.

(56) References Cited

U.S. PATENT DOCUMENTS

| | | | |
|---|---|---|---|
| 4,638,356 A | 1/1987 | Frezza | 358/118 |
| 4,814,984 A | 3/1989 | Thompson | 364/200 |
| 4,939,752 A | 7/1990 | Literati et al. | 375/107 |
| 4,951,225 A | 8/1990 | Lee et al. | 364/513 |
| 4,975,829 A | 12/1990 | Clarey et al. | 364/200 |
| 5,043,981 A | 8/1991 | Firoozmand et al. | 370/85.1 |
| 5,185,736 A * | 2/1993 | Tyrrell et al. | 370/358 |
| 5,185,741 A | 2/1993 | Iguchi et al. | 370/110.1 |
| 5,218,680 A * | 6/1993 | Farrell et al. | 709/215 |
| 5,402,416 A | 3/1995 | Cieslak et al. | 370/60 |
| 5,461,608 A | 10/1995 | Yoshiyama | 370/16.1 |
| 5,513,368 A | 4/1996 | Garcia, Jr. et al. | 395/842 |
| 5,551,066 A | 8/1996 | Stillman et al. | 455/69 |
| 5,610,980 A | 3/1997 | Johnson et al. | 380/4 |
| 5,617,424 A | 4/1997 | Murayama et al. | 370/389 |
| 5,617,537 A * | 4/1997 | Yamada et al. | 709/214 |
| 5,719,938 A | 2/1998 | Haas et al. | 380/21 |
| 5,729,686 A | 3/1998 | Heck et al. | 395/200.38 |
| 5,758,083 A | 5/1998 | Singh et al. | 395/200.53 |
| 5,778,176 A | 7/1998 | Geihs et al. | 395/200.12 |
| 5,793,968 A | 8/1998 | Gregerson et al. | 395/200.39 |
| 5,805,072 A | 9/1998 | Kakemizu | 340/825.03 |

(Continued)

FOREIGN PATENT DOCUMENTS

WO  WO 00/72159  11/2000

OTHER PUBLICATIONS

Nehmer et al, "A Fault Tolerance Approach for Distributed ISDN Control Systems", ACM SIGOPS European Workshop, Proceedings of the fourth workshop on ACM SIGOPS European workshop, 1990, Bologna, Italy, 1990, pp. 1-4.

*Primary Examiner*—John Follansbee
*Assistant Examiner*—M. A. Siddiqi
(74) *Attorney, Agent, or Firm*—Duke W. Yee; Mark E. McBurney; Lisa L. B. Yociss

(57) ABSTRACT

A method for routing System Area Network (SAN) packets to multiple partitions within a single end node is provided. A range of Local Identification addresses (LIDs) are assigned to a channel adapter port within the SAN. Lower order bits within the LID are then assigned to select the particular partition in the end node. The Local ID Mask Control (LMC) field is used to assign multiple LIDs to a single port, using those low order bits to then route the message to the appropriate partition in the end node.

23 Claims, 6 Drawing Sheets

U.S. PATENT DOCUMENTS

| | | | |
|---|---|---|---|
| 5,884,036 A | 3/1999 | Haley | 395/200.54 |
| 5,907,689 A | 5/1999 | Tavallaei et al. | 395/290 |
| 5,951,683 A | 9/1999 | Yuuki et al. | 713/1 |
| 6,032,191 A | 2/2000 | Chowdhury et al. | 709/238 |
| 6,081,752 A | 6/2000 | Benson, IV et al. | 700/79 |
| 6,085,238 A | 7/2000 | Yuasa et al. | 709/223 |
| 6,092,214 A | 7/2000 | Quoc et al. | 714/4 |
| 6,098,098 A | 8/2000 | Sandahl et al. | 709/221 |
| 6,108,739 A | 8/2000 | James et al. | 710/113 |
| 6,115,776 A | 9/2000 | Reid et al. | 710/260 |
| 6,128,738 A | 10/2000 | Doyle et al. | 713/185 |
| 6,192,397 B1 | 2/2001 | Thompson | 709/209 |
| 6,199,133 B1 | 3/2001 | Schnell | 710/110 |
| 6,222,822 B1 | 4/2001 | Gerardin et al. | 370/230 |
| 6,269,396 B1 | 7/2001 | Shah et al. | 709/223 |
| 6,298,376 B1 | 10/2001 | Rosner et al. | 709/209 |
| 6,304,973 B1 | 10/2001 | Williams | 713/201 |
| 6,311,321 B1 | 10/2001 | Agnihotri et al. | 717/1 |
| 6,330,555 B1 * | 12/2001 | Weber | 707/2 |
| 6,341,322 B1 | 1/2002 | Liu et al. | 710/129 |
| 6,343,320 B1 | 1/2002 | Fairchild et al. | 709/224 |
| 6,363,411 B1 | 3/2002 | Dugan et al. | 709/202 |
| 6,363,416 B1 | 3/2002 | Naeimi et al. | 709/209 |
| 6,363,495 B1 | 3/2002 | MacKenzie et al. | 714/4 |
| 6,389,432 B1 | 5/2002 | Pothapragada et al. | 707/205 |
| 6,421,779 B1 | 7/2002 | Kuroda et al. | 713/169 |
| 6,434,113 B1 | 8/2002 | Gubbi | 370/216 |
| 6,470,397 B1 | 10/2002 | Shah et al. | 709/250 |
| 6,496,503 B1 | 12/2002 | Pelissier et al. | 370/389 |
| 6,507,592 B1 | 1/2003 | Hurvig et al. | 370/503 |
| 6,529,286 B1 | 3/2003 | King | 358/1.14 |
| 6,597,956 B1 | 7/2003 | Aziz et al. | 700/3 |
| 6,636,520 B1 | 10/2003 | Jason et al. | 370/401 |
| 6,654,363 B1 | 11/2003 | Li et al. | 370/338 |
| 6,658,417 B1 | 12/2003 | Stakutis et al. | 707/10 |
| 6,664,978 B1 | 12/2003 | Kekic et al. | 345/733 |
| 6,665,714 B1 | 12/2003 | Blumenau et al. | 709/222 |
| 6,674,911 B1 * | 1/2004 | Pearlman et al. | 382/240 |
| 6,694,361 B1 | 2/2004 | Shah et al. | 709/222 |
| 6,708,272 B1 | 3/2004 | McCown et al. | 713/151 |
| 2002/0021307 A1 | 2/2002 | Glenn et al. | 345/753 |
| 2002/0026517 A1 | 2/2002 | Watson, Jr. | 709/228 |
| 2002/0073257 A1 | 6/2002 | Beukema et al. | 710/105 |
| 2002/0133620 A1 | 9/2002 | Krause | 709/238 |
| 2003/0018787 A1 | 1/2003 | Neal et al. | 709/227 |
| 2003/0046505 A1 | 3/2003 | Craddock et al. | 711/165 |
| 2004/0057424 A1 | 3/2004 | Kokkonen | 370/352 |

\* cited by examiner

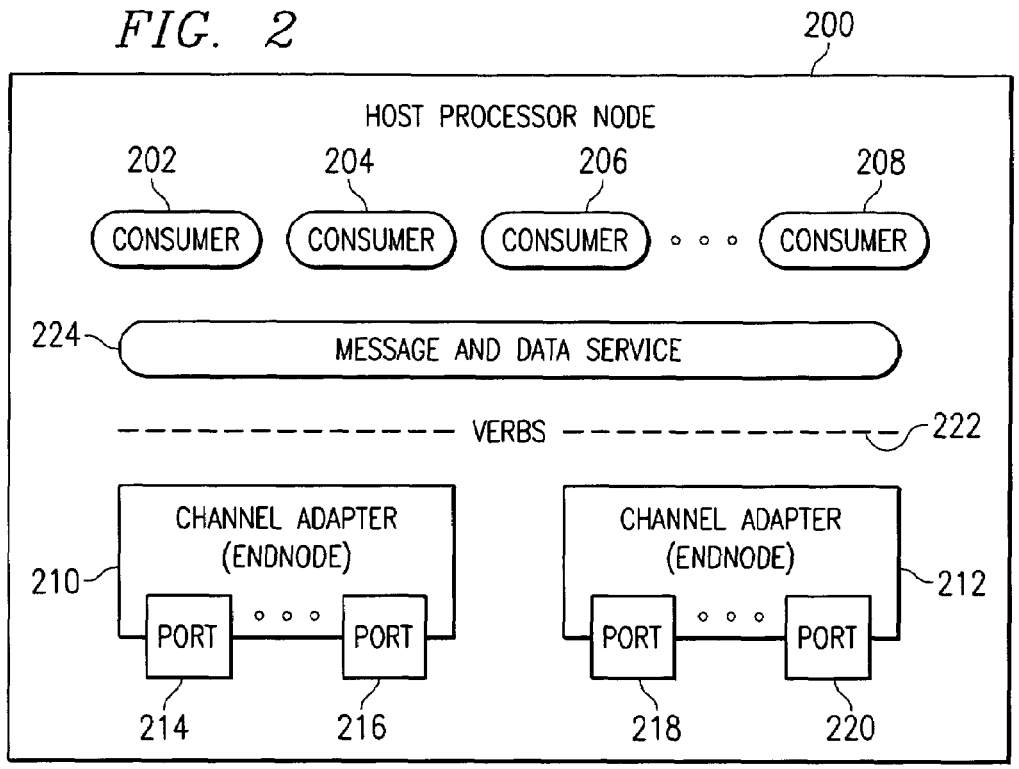
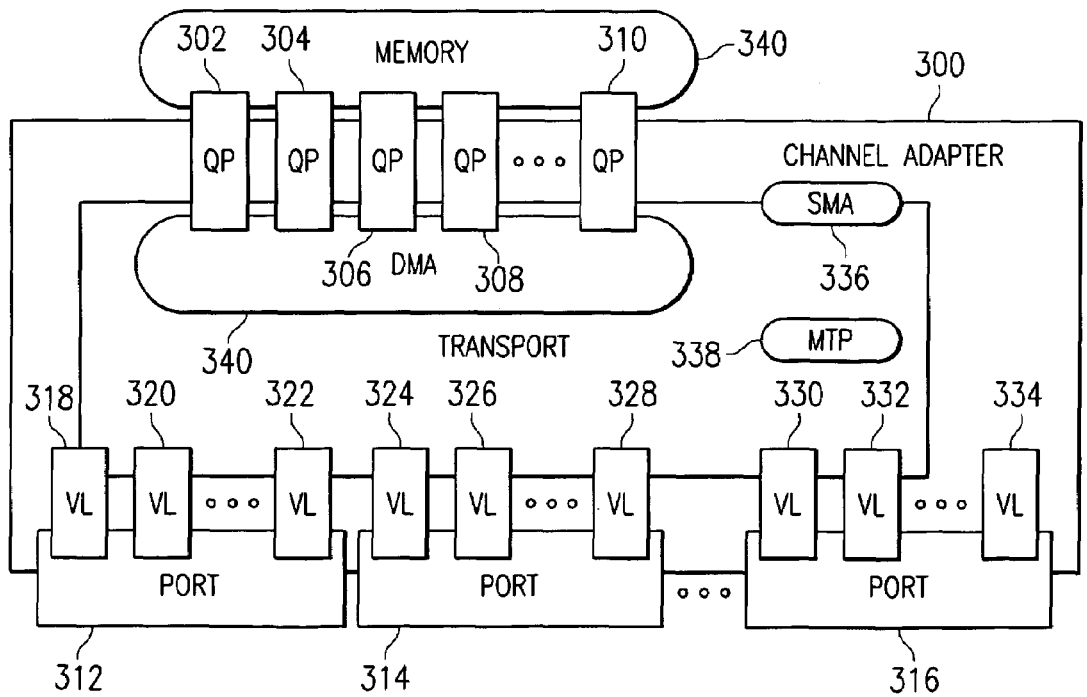

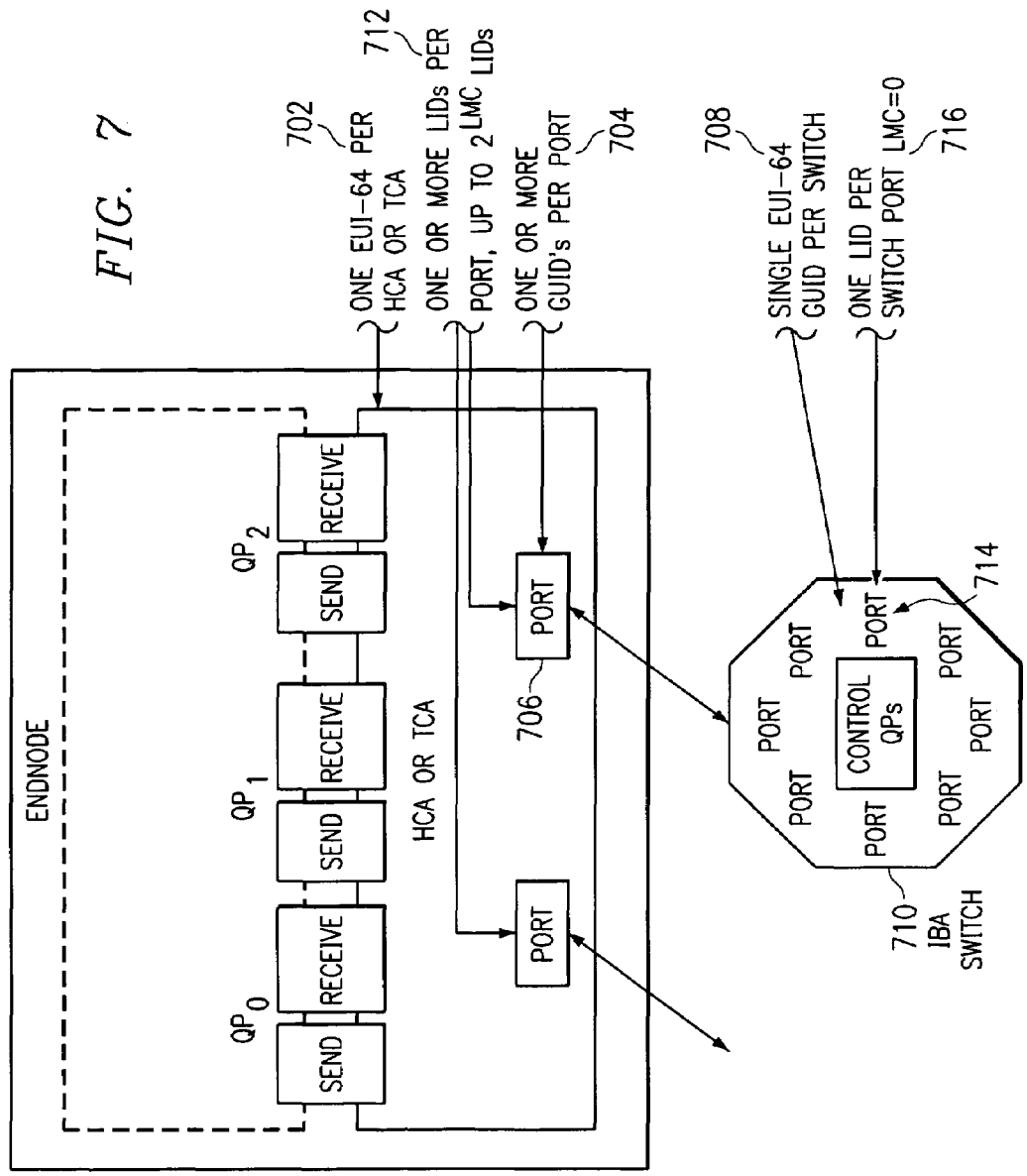

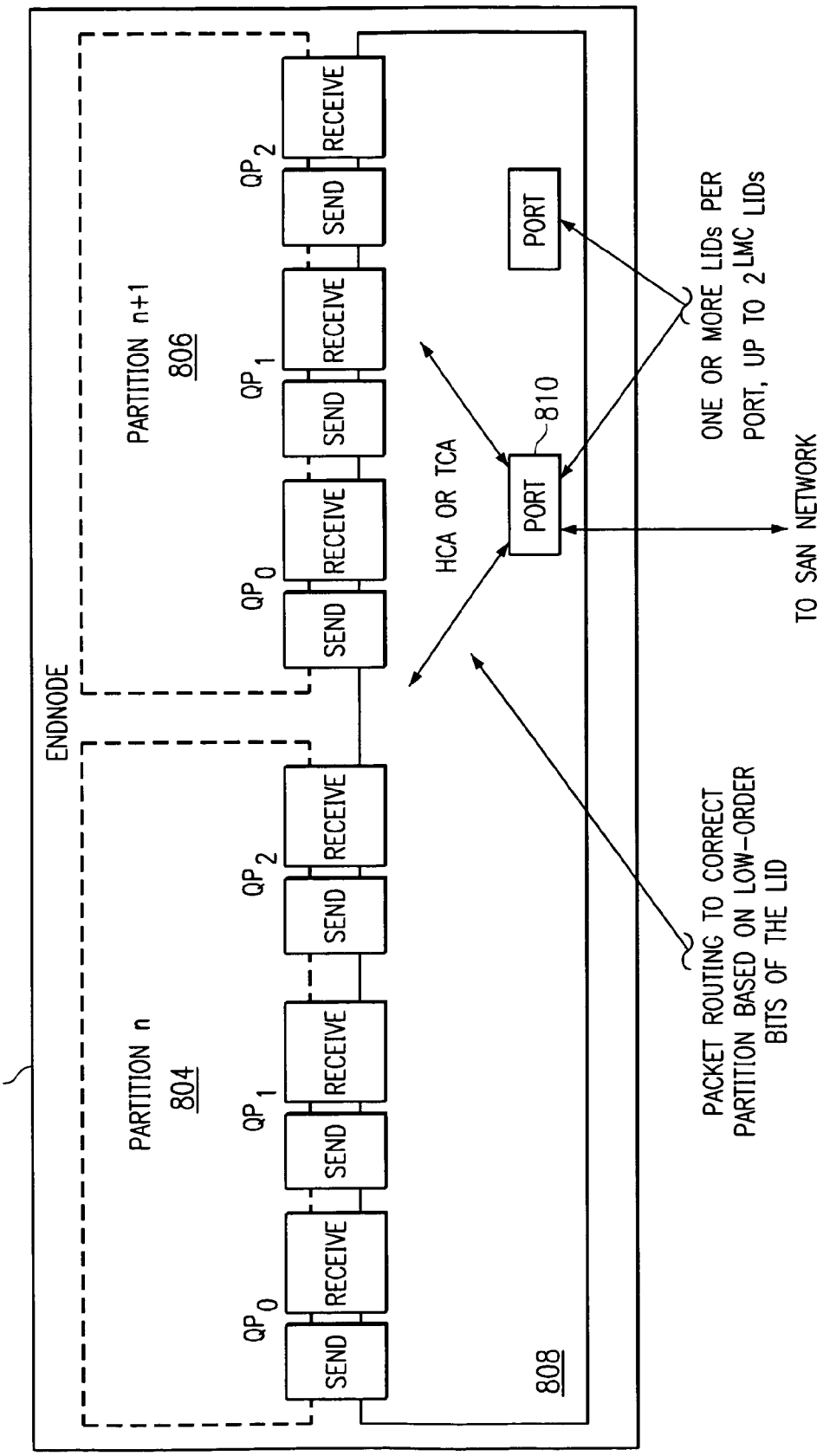

END NODE PARTITIONING USING LMC FOR A SYSTEM AREA NETWORK

CROSS REFERENCES TO RELATED APPLICATIONS

The present invention is related to applications entitled A System Area Network of End-to-End Context via Reliable Datagram Domains, Ser. No. 09/692,354, Method and Apparatus for Pausing a Send Queue without Causing Sympathy Errors, Ser. No. 09/692,234, End Node Partitioning using LMC for a System Area Network, Ser. No. 09/692,351, Method and Apparatus for Dynamic Retention of System Area Network Management Information in Non-Volatile Store, Ser. No. 09/692,365, Method and Apparatus for Retaining Network Security Settings Across Power Cycles, Ser. No. 09/692,337, Method and Apparatus for Reporting Unauthorized Attempts to Access Nodes in a Network Computing System, Ser. No. 09/692,348, Method and Apparatus for Reliably Choosing a Master Network Manager During Initialization of a Network Computing System, Ser. No. 09/692,346. Method and Apparatus for Ensuring Scalable Mastership During Initialization of a System Area Network, Ser. No. 09/692,341, and Method and Apparatus for Using a Service ID for the Equivalent of Port ID in a Network Computing System, Ser. No. 09/692,352, all of which are filed even date hereof, assigned to the same assignee, and incorporated herein by reference.

BACKGROUND OF THE INVENTION

1. Technical Field

The present invention relates generally to an improved data processing system, and in particular to a method and apparatus for identifying connections between data processing systems. Still more particularly, the present invention provides a method and apparatus for establishing connections with a process on a data processing system with partitioning of System Area Network (SAN) end nodes to accommodate Logical Partitioning (LPAR).

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

A Local Identification (LID) refers to a short address used to identify a Channel Adapter (CA) port within a single subnet. A source LID (SLID) and a destination LID (DLID) are the source and destination LIDs used in a SAN communication packet header. The LID Mask Control (LMC) field in the SAN communication packet identifies the number of low order bits that can be used for routing the packet through different paths in the network. This means that a single CA port has up to $2^{LMC}$ LIDs assigned to it.

It is common for a system to be divided into Logical Partitions (LPARs) where various resources are allocated to a various user. For example, some systems can have various processors dedicated to one instance of the operating system and other processors in the same system allocated to another instance. The purpose of LPAR is so that if there is failure in the hardware or software, at most just the users in the same partition are affected and not the other partitions.

The problem occurs on how to route SAN packets to the correct partitions in an efficient manner, when those partitions are sharing a SAN port.

SUMMARY OF THE INVENTION

The present invention provides a distributed computing system having end nodes, switches, routers, and links interconnecting these components. Each end nodes uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

The present invention solves the problem of routing SAN packets to the correct partitions in an efficient manner, when those partitions are sharing a SAN port, by using the Local ID Mask Control (LMC) field to assign different LIDs to different partitions, and then using those low order bits to route the message to the appropriate partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a functional block diagram of a host processor node in accordance with a preferred embodiment of the present invention;

FIG. 3 is a diagram of a host channel adapter in accordance with a preferred embodiment of the present invention;

FIG. 7 depicts a schematic diagram illustrating the network addressing used in a distributed networking system in accordance with the present invention; and FIG. 8 depicts a schematic diagram illustrating the partition addressing using the LMC field in accordance with the present invention.

DETAILED DESCRIPTION OF THE PREFERRED EMBODIMENT

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

Figure 1:
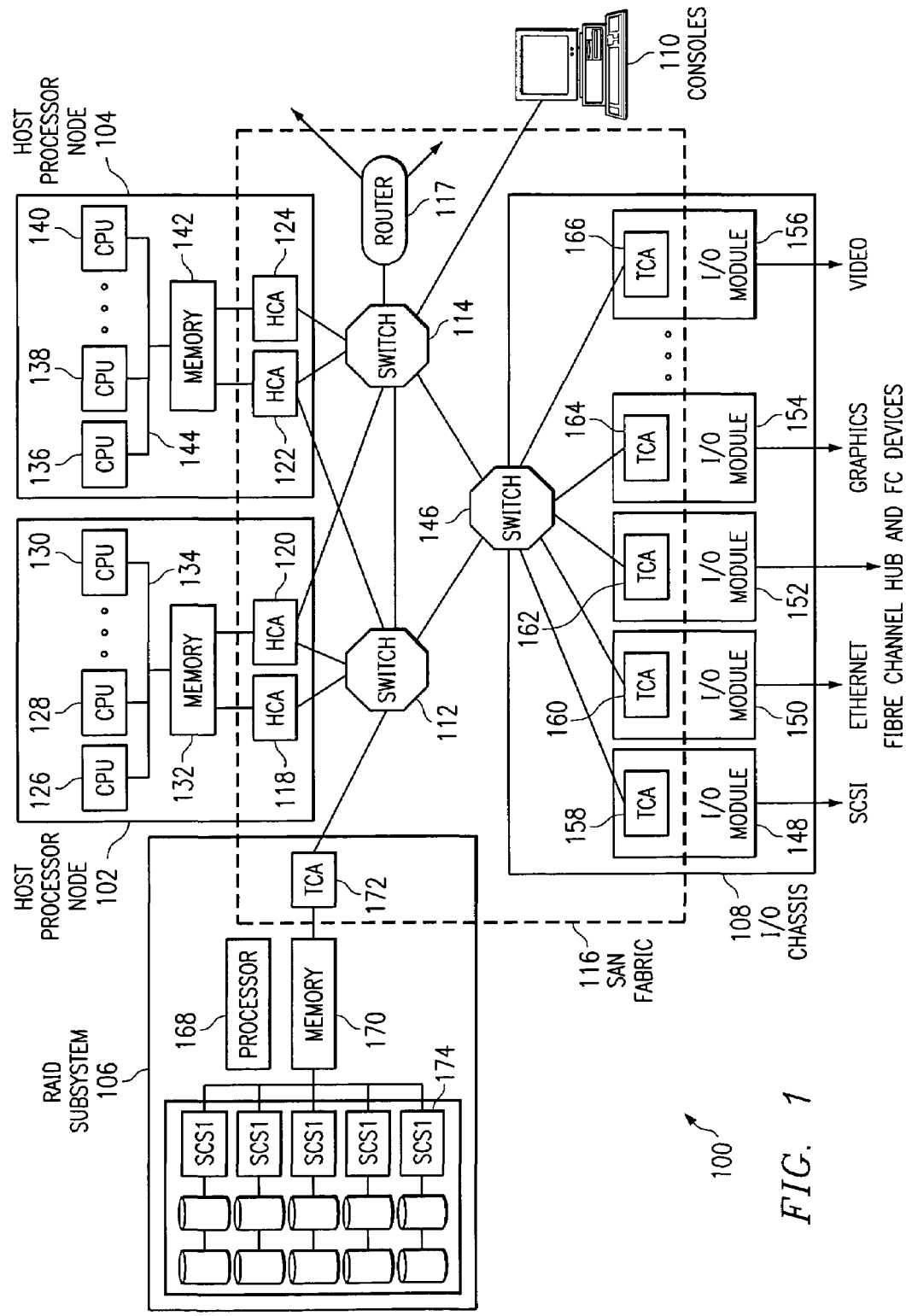
FIG. 1 is a diagram of a network computing system is illustrated in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the network computing system. A node is any component attached to one or more links of a network. In the depicted example, SAN 100 includes nodes in the form of host processor node 102, host processor node 104, redundant array independent disk (RAID) subsystem node 106, switch node 112, switch node 114, router node 117, and I/O chassis node 108. The nodes illustrated in FIG. 1 are for illustrative purposes only, as SAN 100 can connect any number and any type of independent processor nodes, and I/O adapter nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID.

Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
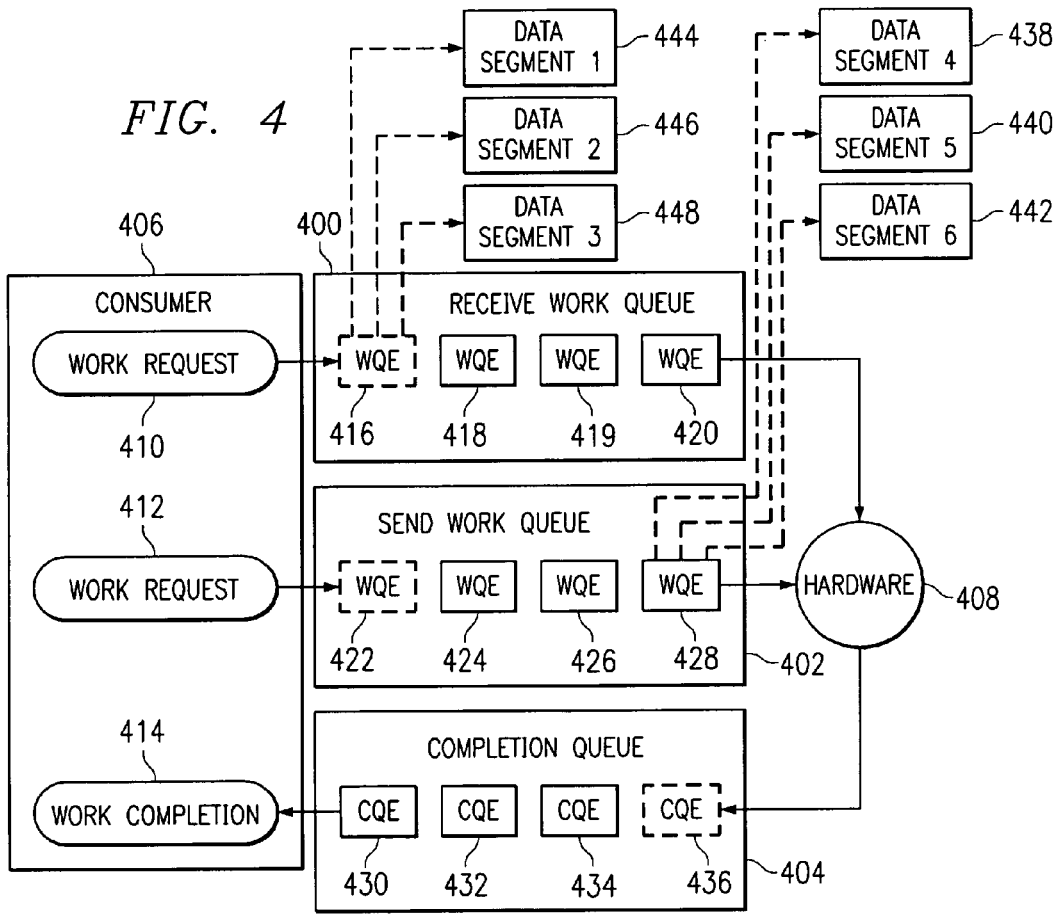
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a network computing system implementing the present invention supports four types of transport services.

Reliable and Unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an end node with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

The unreliable datagram service is connectionless. The unreliable datagram service is employed by management applications to discover and integrate new switches, routers, and endnodes into a given network computing system. The unreliable datagram service does not provide the reliability guarantees of the reliable connection service and the reliable datagram service. The unreliable datagram service accordingly operates with less state information maintained at each end node.

Figure 5:
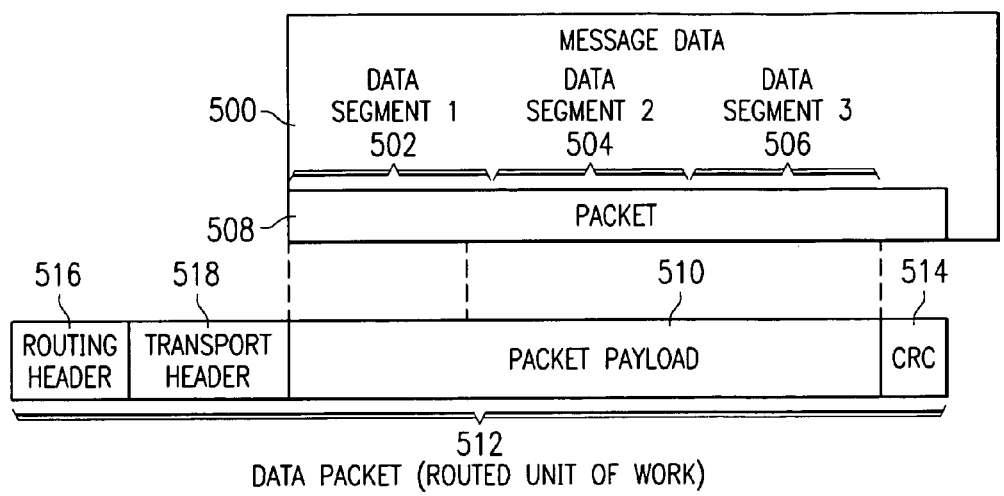
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an end node may be configured to be members of one or more possibly overlapping sets called partitions.

Figure 6:
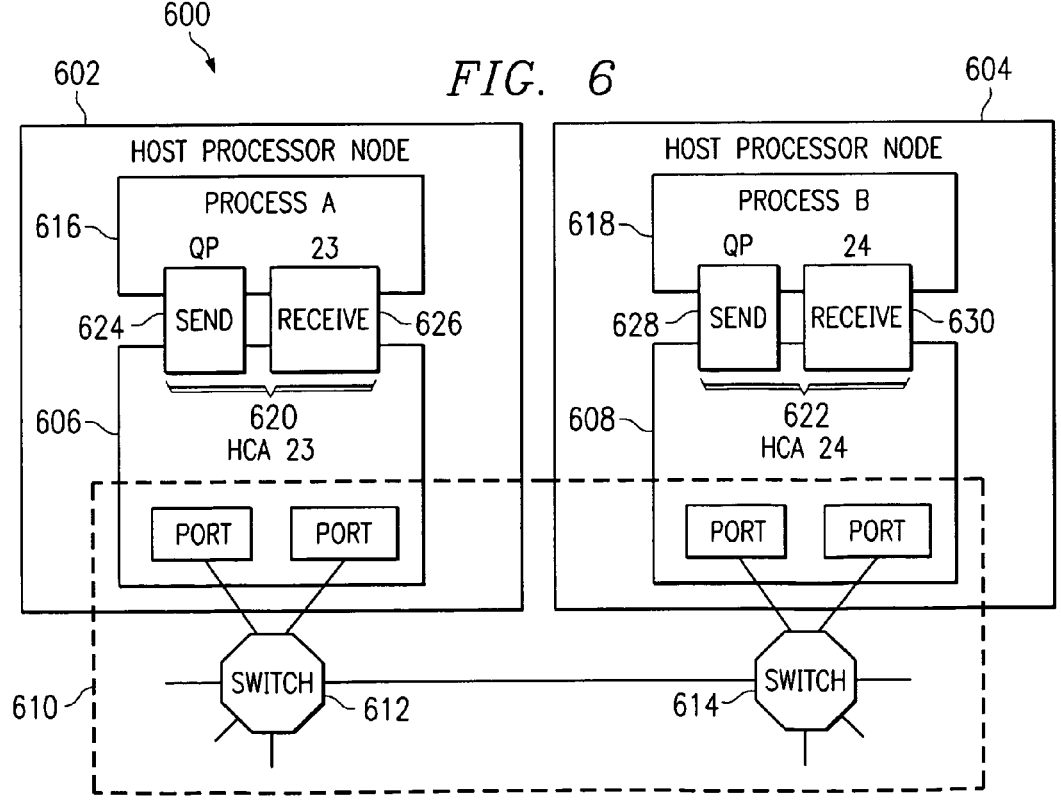
FIG. 6 is a diagram of a communication over a portion of a SAN fabric.

Referring to FIG. 6, a schematic diagram illustrating a portion of a network computing system is depicted in accordance with the present invention. The network computing system 600 in FIG. 6 includes a host processor node 602 and a host processor node 604. Host processor node 602 includes a HCA 606 and host processor node 604 includes a HCA 608. The network computing system 600 in FIG. 6 includes a SAN fabric 610 which includes a switch 612 and a switch 614. The SAN fabric 610 in FIG. 6 includes a link coupling HCA 606 to switch 612; a link coupling switch 612 to switch 614; and a link coupling HCA 608 to switch 614.

In the example transactions, host processor node 602 includes a client process A 616, and host processor node 604 includes a client process B 618. Client process A 616 interacts with HCA hardware 606 through QP 620. Client process B 618 interacts with HCA hardware 608 through QP 622. QP 620 and QP 622 are data structures. QP 620 includes include a send work queue 624 and a receive work queue 626. QP 622 includes include a send work queue 628 and a receive work queue 630.

Process A 616 initiates a message request by posting WQEs to the send queue 624 of QP 620. Such a WQE is illustrated by WQE 428 in FIG. 4. The message request of client process A 616 is referenced by a gather list contained in the send WQE 428. Each data segment in the gather list points to a virtually contiguous local memory region, which contains a part of the message. This is indicated by data segments 4 438, 5 440, and 6 442, which respectively hold message parts 4, 5, and 6.

Hardware in HCA 606 reads the WQE and segments the message stored in virtual contiguous buffers into packets, such as packet 512 in FIG. 5. Packets are routed through the SAN fabric 610, and for reliable transfer services, are acknowledged by the final destination end node, which in this case is host processor node 604. If not successively acknowledged, the packet is retransmitted by the source end node, host processor node 602. Packets are generated by source endnodes and consumed by destination endnodes.

In reference to FIG. 7, a schematic diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 702 is assigned to each component. A component can be a switch, router, or CA.

One or more globally unique ID (GUID) identifiers 704 are assigned per CA port 706. Multiple GUIDs (a.k.a. IP addresses) can be used for several reasons, some of which are provided by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes.

One GUID 708 is assigned to a switch 710.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 706 has up to $2^{LMC}$ LIDs 712 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet.

A single switch port 714 has one LID 716 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Referring now to FIG. 8, a schematic diagram illustrating the partition addressing using the LMC field is depicted in accordance with the present invention. An end node 802 can have its facilities divided into several divisions, with each division allocated to one of several Logical Partitions (LPARs) 804 and 806. The multiple partitions 804 and 806 of the end node 802 may communicate through the same HCA or TCA port 810. Packets are directed across the SAN and to a port 810 via the LID address in the SAN packet. The problem arises when packets destined for different LPARS, 804 or 806, must pass through the same CA port 810. The present invention solves this problem by using the LMC to create more specific routing directions within the end node and port addresses within a packet.

Multiple LIDs can be assigned to a port by using the LMC capability of the SAN packet. The LMC can be any number of bits, but in one embodiment there are three bits. In this embodiment, up to eight lower order bits ($2^{LMC}$, LMC=3) of the LID can be designated as addresses that get targeted to a particular port. The lower order bits designated by the LMC act as an addresses within an address. Whereas the LID designates the port 810 to which a packet is sent, the lower order bits designate the specific LPAR 804 or 806 within the end node 802 to which a packet is to be routed.

By using the LMC to create partition routing instructions, the present invention provides an easy and efficient routing mechanism within a single end node without the need for additional hardware or processing resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for routing data packets to multiple partitions within a single end node, comprising:
   assigning a range of local identification addresses (LIDs) to a channel adapter port in an end node; and
   assigning bits within the local identification addresses to specify which of several partitions within the end node is being addressed.

2. The method of claim 1, wherein the bits are lower order bits.

3. The method according to claim 1, wherein the channel adapter port is connected to a system area network.

4. The method according to claim 1, wherein:
   the network contains two raised to the N power end nodes, switches, and routers; and
   the number of bits in a local identification address equals N.

5. The method according to claim 2, wherein the lower order bits assigned to partitions are designated by a local identification mask control (LMC) field.

6. The method according to claim 5, wherein the local identification mask control can be any number of bits.

7. The method according to claim 5, wherein a number of lower order bits assigned to addressing within a port is up to two raised to the local identification mask control power.

8. The method according to claim 7, wherein the different local identification addresses of a port identify different partitions within the end node.

9. A computer program product in a computer readable medium for use in a data process system for routing data packets to multiple partitions within a single end node, the computer program product comprising:
   instructions for assigning a local identification address to a channel adapter port in an end node; and
   instructions for assigning bits within the local identification address to a specific partition within the end node.

10. The computer program product of claim 9, wherein the bits are lower order bits.

11. The computer program product according to claim 9, further comprising instructions for connecting the channel adapter port to a system area network.

12. The computer program product according to claim 9, wherein:
   if the network contains two raised to the N power end nodes, switches, and routers;
   the number of bits in a local identification address equals N.

13. The computer program product according to claim 10, wherein the lower order bits assigned to partitions are designated by a local identification mask control (LMC) field.

14. The computer program product according to claim 13, wherein the local identification mask control can be any number of bits.

15. The computer program product according to claim 13, wherein the number of lower order bits assigned to addressing within a port is up to two raised to the local identification mask control power.

16. The computer program product according to claim 15, wherein the different local identification addresses of a port identify different partitions within the end node.

17. A system for routing data packets to multiple partitions within a single end node, comprising:
   means for assigning a local identification address (LID) to a channel adapter port in a network end node; and
   means for assigning lower order bits within the local identification addresses to a specific partition within the end node.

18. The system according to claim 17, wherein the channel adapter port is connected to a system area network.

19. The method according to claim 17, wherein:
   the network contains two raised to the N power end nodes, switches, and routers; and
   the number of bits in a local identification address equals N.

20. The system according to claim 17, wherein the lower order bits assigned to partitions are designated by a local identification mask control (LMC) field.

21. The method according to claim 20, wherein the LMC can be any number of bits.

22. The system according to claim 20, wherein the number of lower order bits assign to addressing within a port is up to two raised to the local identification mask control power.

23. The system according to claim 22, wherein the different local identifier addresses of a port identify different partitions within the end node.

* * * * *